United States Patent Office 3,291,660
Patented Dec. 13, 1966

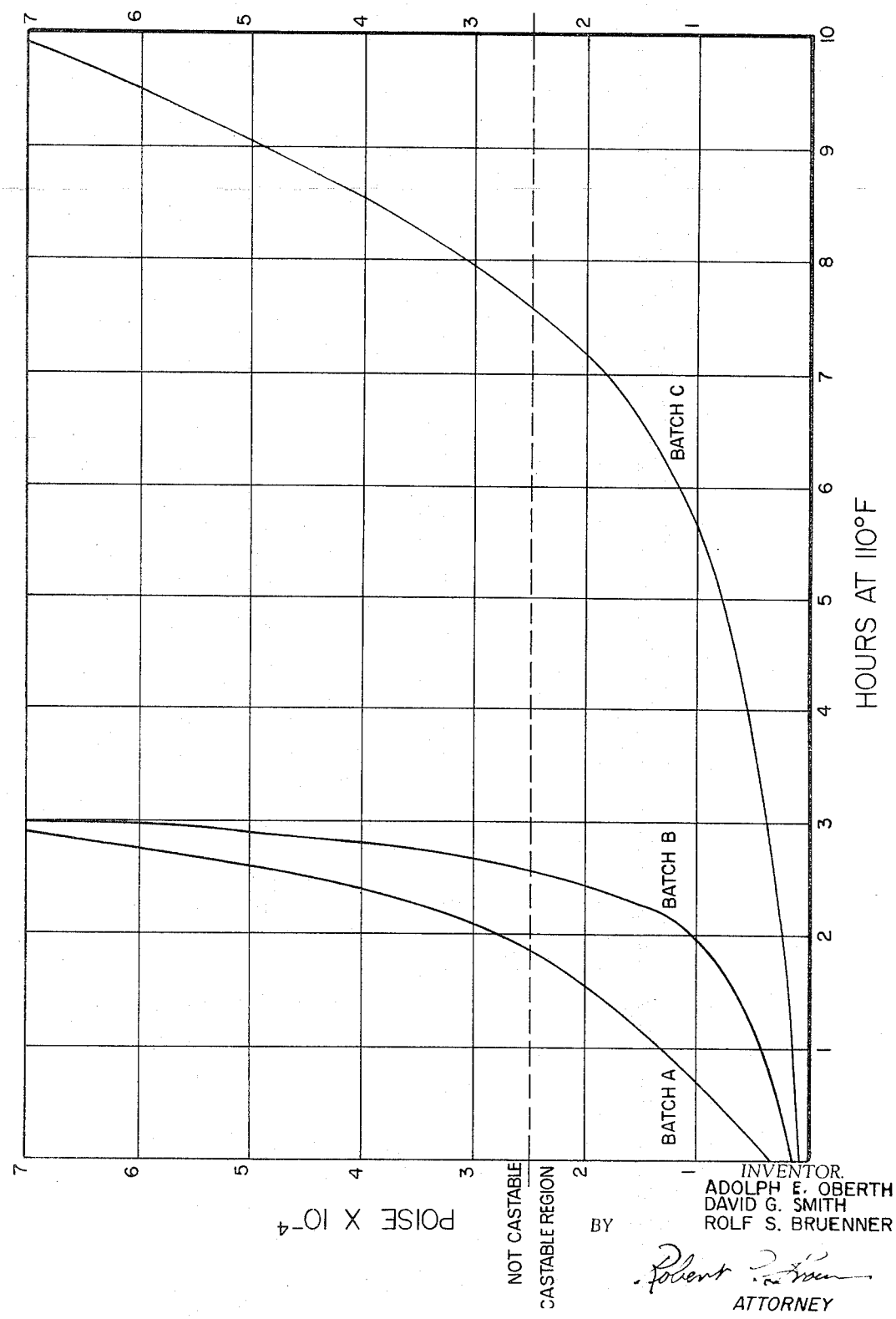

3,291,660
POLYURETHANE PROPELLANT FORMULATIONS
AND PROCESS
Adolph E. Oberth, Fairoaks, David G. Smith, Rancho Cordova, and Rolf S. Bruenner, Orangevale, Calif., assignors to Aerojet-General Corporation, Azusa, Calif., a corporation of Ohio
Filed Jan. 24, 1963, Ser. No. 254,856
21 Claims. (Cl. 149—19)

This invention relates to a method of increasing the pot life of polyurethane propellant formulations containing a high solids loading.

It has been previously found, as is shown in assignee's U.S. patent applications, Serial Nos. 33,054 and 33,055, now Pat. No. 3,141,294 filed May 31, 1960, that metal chelates may be used as catalysts for the preparation of polyurethane propellants. While these metal chelates are excellent catalysts for polyurethanes, problems have been encountered in their use with large batches of polyurethane propellants. Such batches are satisfactory only if they possess an adequate pot life; i.e., retention of castability after completion of the mixing process for a prolonged period.

Adequate pot life is essential in preparing propellant batches for very large solid rocket motors where it is often necessary to prepare many batches which must be combined to make a large single casting. Since the required number of batches for the large casting frequently cannot be made up simultaneously with the available mixing equipment, several batches may have to be mixed and held in an uncured state while additional batches are prepared. This can be effectively done only if the batches have a prolonged pot life. Otherwise, the first-prepared batches may be partially cured before the other necessary batches can be mixed. This results in poor castability of the partially cured batches and lack of uniformity of the casting upon combining of the individual batches. A solid rocket motor casting which is not uniform in cure can result in cracking and irregular burning of the propellant, leading to engine failure.

Previously, adequate pot life was obtained by reduction of catalyst concentration to levels where the curability of the formulation can be endangered, limitation of the alcoholic binder constituents to these slow reacting binder components containing secondary hydroxyl groups, or the performing of the propellant mixing process at low temperatures. It has now been found that the addition of alpha, gamma diketones to these metal chelate-catalyzed polyurethane batches avoids the need of the compromises heretofore employed.

It is an object of this invention to prepare polyurethane propellant batches which have an adequate pot life. Still another object of this invention is to employ alpha, gamma diketones to reduce the rate of initial propellant cure reaction without significantly extending the time required to fully cure polyurethane propellants employing metal chelates as the cure catalyst. These and other objects of this invention will be apparent from the detailed description which follows.

The metal chelate catalysts which may be employed in the practice of this invention are those disclosed in U.S. Patent No. 2,933,462, and the structural formula (I)

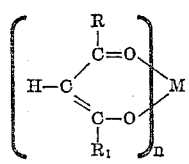

wherein R and $R_1$ are non-reactive monovalent organic radicals, M is a metal radical, having a coordination number preferably equal to twice its electro valence and $n$ is an integer which corresponds to the electro valence of M, and is an integer of from 1 to about 4. The preferred catalyst is ferric-acetylacetonate since its use has been found to minimize undesirable side reactions during the curing. R and $R_1$ are not limited to alkyl groups since other organic radicals which are substantially unreactive with the monomers or other ingredients present in the polyurethane batch will suffice for our purpose.

In the foregoing formula, R and $R_1$ may be the same or different non-reactive monovalent organic radicals. Typical of such radicals are the alkyl, aryl, aralkyl, cycloalkyl, alkoxy, haloalkyl and haloaryl groups. Specifically, R and $R_1$ may be methyl, ethyl, isopropyl, decyl, phenyl, naphthyl, tolyl, cyclopentyl, cyclohexyl, methoxy, ethoxy, chlorophenyl, chloromethyl, and the like. Preferably, R and $R_1$ are the lower members of the series, containing from 1 to about 12 carbon atoms, and may be branched or straight chain. Suitable metal chelates include vanadyl acetylacetonate, chromium acetylacetonate, beryllium acetylacetonate, cerrous acetylacetonate, zirconium acetylacetonate, aluminum acetylacetonate, bis (dibenzoylmethane) Cu(II), bis(ethylacetoacetate) Cu(II), etc.

As is disclosed in U.S. Patent No. 2,933,462, M in the above formula may be a metal such as copper, beryllium, magnesium, strontium, zinc, mercury, aluminum, indium, lanthanum, cerium, praseodymium, neodymium, samarium, zirconium, chromium, molybdenum, uranium, manganese, iron, cobalt, nickel, platinum, palladium, cesium, cadmium, scandium, thorium, vanadium, gallium, thallium, yttrium, europium, gadolinium, hafnium, lead and plutonium.

In general, M is a metal from Groups I–VIII of the Periodic Table or from the lanthanum or actinium series. By metals of Groups I–VIII are intended all of those elements in (1) Groups IA and IIA of Period 2
(2) Groups IA–IIIA of Period 3
(3) Groups IA–IVA, IB–VIIIB and VIII of Period 4
(4) Groups IA–VA, IB–VIIB and VIII of Period 5
(5) Group IA–VIA, IB–VIIB and VIII of Period 6
(6) Groups IA, IIA and IIIB of Period 7 of the Periodic Table as it appears in the Handbook of Chemistry and Physics, 42nd edition, pages 448 and 449.

The alpha, gamma diketones useful in the practice of this invention are those having the formula (II) 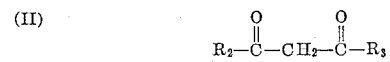

wherein $R_2$ and $R_3$ are monovalent organic radicals selected from the group consisting of alkyl, aryl, haloalkyl and haloaryl radicals, preferably those having from 1 to about 10 carbon atoms. Specifically, $R_2$ and $R_3$ can be any of the alkyl, aryl, haloalkyl and haloaryl groups set forth above for R and $R_1$ in Formula I. The preferred alpha, gamma diketone is acetylacetone. Illustrative of other alpha, gamma diektones are benzoylacetone, chlorobenzoylacetone and butanoylacetone.

The essential ingredients in the highly loaded propellant formulations suitable in the practice of this invention are those containing a polyurethane binder and a finely divided oxidizing agent. Particularly suitable polyurethane propellant formulations are any of those shown in assignee's above-mentioned copending applications, Serial Nos. 33,054 and 33,055. These polyurethane binders employed in these formulations are prepared by the reaction of a compound having two or more active hydrogen groups capable of polymerizing with an isocyanate, with an organic compound having as the sole reacting groups two or more isocyanate or isothiocyanate groups. The compound having the active hydrogen groups is preferably an organic compound having as its sole reacting groups hydroxyl or thiol groups. Normally, the binder ingredients account for from about 5 percent to about 5.5 percent by weight of the total propellant formulation. Preferably, the weight of the binder accounts for 10 percent to 30 percent of the total propellant.

The isocyanate starting materials for the polyurethane binders are preferably diisocyanates but not necessarily so since other polyisocyanates such as triisocyanates may be employed within the scope of this invention.

The preferred diisocyanate compounds can be saturated or unsaturated, aliphatic or aromatic, open or closed chained, and contain from 2 to 20 carbon atoms. Illustrative of such diisocyanates are the alkane diisocyanates such as hexamethylene diisocyanate and butylene diisocyanate; the aromatic diisocyanates such as 2,4-toluene diisocyanate, 2,6-toluene diisocyanate, paraphenylene diisocyanate and naphthylene-1,4-diisocyanate; the cycloalkylene diisocyanates such as cyclohexylene-1,3-diisocyanate and cyclohexylene-1,4-diisocyanate; aliphatic aromatic diisocyanates such as xylylene-1,4-diisocyanate and 4,4-diphenylene methane diisocyanate. Other suitable diisocyanates are the nitraza-interrupted diisocyanates such as 3-nitraza-1,5-pentane diisocyanate.

The preferred hydroxy starting materials for our polyurethane binders are dihydroxy compounds having the general formula $$HO-R_4-OH$$

wherein $R_4$ is a divalent organic radical such as alkylene, oxyalkylene, cycloalkylene, arylene aromatic-aliphatic, or alkylene radicals containing ester linkages. Illustrative of some of the polyhydroxy compounds suitable in the preparation of the polyurethane binders are 2,2-di(4-hydroxyphenyl)propane, cyclohexanediol - 1,4,ethylene glycol, resorcinol, polyether glycols such as polypropylene ether glycol and polyesters such as those obtained from the reaction of a dihydric alcohol such as ethylene glycol or propylene glycol with a dicarboxylic acid such such as adipic acid or sebacic acid. The polyesters most suitable for the purposes of this invention are those having a molecular weight of from about 1000 to about 2500. Polyether glycols most suitable for this invention are those having a molecular weight of from about 400 to about 10,000. It is within the scope of this invention to employ mixtures of hydroxy compounds.

As is well known in the art, polyisothiocyanates and polythiols react to produce polyurethanes in a manner similar to the polymerization of isocyanates and polyol compounds. For example diisothiocyanates such as butylene-1,3-diisothiocyanate and paraphenylene diisothiocyanate react with polythiol compounds such as decamethylene dithio and thioresorcinol to yield corresponding polyurethane polymers.

In addition to the isocyantes, isothiocyanates, polyols and thiols previously mentioned, other compounds containing groups polymerizable with either hydroxy or isocyanate groups can be employed as cross-linking agents in the preparation of the polyurethane binders. In general, trihydroxy compounds are the preferred cross-linkers. Typical cross-linking compounds are glycerol monoricinoleate, glycerol triricinoleate, trimethylol propane, and N,N,N',N'-tetrakis(2-hydroxypropyl)ethylenediamine.

If desired, there may also be included in the propellant batches of this invention, metals which serve to improve the characteristics of the resultant propellant. The metal component normally employed in the polyurethane propellant is preferably in finely divided form. Aluminum is the most commonly employed of the powdered metals. While the particle size of the metal is not critical, the preferred particle sizes are those wherein the metal has an average particle size of around 25 microns. The metal serves as a combustion additive or resonance suppressor, depending on the amount employed. Other powdered metals such as silicon and beryllium may also be used.

The oxidizers employed in the propellant formulations of this invention can be any solid inorganic oxidizing salt well known to those skilled in the art. Examples of suitable oxidizing salts are the chromates, dichromates, permanganates, nitrates, and perchlorates of ammonium and of the alkali or alkaline earth metals such as lithium, potassium, sodium or calcium. Likewise, oxidizers such as nitronium perchlorate and hydrazine perchlorate may be used. The selection of the oxidizing salt depends upon the specific burning properties desired in the propellant grain. Thus, where a slow burning propellant is desired, a non-metallic oxidizing salt such as ammonium perchlorate or ammonium nitrate could be employed rather than an oxidizing salt such as sodium nitrate or calcium chlorate. Various other additives may be employed in the propellant formulations of this invention. For example, plasticizers such as 2,2-dinitropropyl-4-nitraza pentanoate and dioctyl azelate may be employed.

Burning rate modifiers and other additives such as anti-oxidants, wetting agents, anti-foaming agents, and the like, can also be employed in the formulation of our propellants. Thus, for example, copper chromite in an amount of about 0.1 percent to about 4 percent by weight of the propellant composition has been found to be useful for increasing the burning rate of the propellant. Wetting agents such as lecithin are useful in the preparation of our propellant formulations. Preferably these wetting agents are employed in an affective amount up to about 0.2 percent by weight of the total propellant composition.

The chelate catalysts employed in the instant invention are normally present in an effective amount; i.e., a catalytic amount, of from about 0.002 percent by weight to about 1 percent by weight of the total propellant formulation. However, higher proportions of chelate can be used if desired.

The metal powder optionally used in the practice of this invention is preferably employed in an amount from about 0.5 percent to about 40 percent by weight of the total propellant composition. Likewise, the solid inorganic oxidizing salt is preferably employed in an amount from about 95 percent to about 45 percent by weight of the total propellant composition. Preferably the weight ratio of oxidizer to binder plus metal in our propellant should be from about 1–3 to about 2–3.

The processing steps of this invention can be carried out in conventional equipment. A mixer which has been found to be particularly effective for mixing the propellant formulations of this invention is that known commercially as the P Mixer. The P Mixer is manufactured by Baker Perkins, Inc., of Saginaw, Michigan and can be equipped with facilities for heating, cooling and vacuumizing propellant batches during mixing for use where such facilities appear to be warranted.

There are many ways of processing the various ingredients within the scope of this invention. Preferably, the aluminum is added to one or more of the liquid binder components of the system prior to the incorporation of the oxidizers and other ingredients. Where the polyurethane reactants are diols and diisocyanates and the cross-linkers are polyhydroxy compounds, the diol can be first mixed with the cross-linker and the aluminum added to the liquid mixture after which the oxidizer and the diisocyanate can be added to the mass. The metal chelate catalyst and the alpha, gamma diketone together with other additives, can be introduced into the mixture prior to or at the same time as the addition of the diisocyanate or subsequent to this addition.

After the polyurethane propellant batches of this invention have been mixed to a substantial uniformity, they can be maintained in this state for prolonged periods because of their improved pot life. When these batches are cast, they can be cured, preferably at a temperature within the range from about 130° F. to about 180° F. If desired, the propellant mixture can be cast directly into a rocket chamber lined with an inert linear material and cured therein. The resultant solid propellants have a specific impulse in the range from about 200 seconds to about 300 seconds.

The proportions of the ingredients which go to make up the polyurethane binder can vary over wide ranges, depending upon the properties desired in the propellant and the specific reactants employed. Although stoichiometric proportions of hydroxy and isocyanate components can be employed in the preparation of the polyurethane binder, we have found that the product of improved mechanical properties is obtained if a slight stoichiometric excess of isocyanate or isothiocyanate groups over hydroxy or thiol groups is present in the mixture. Consequently, for the best results we have found that there should be from about 100 to about 115 equivalents of isocyanate or isothiocyanate containing monomer in the fuel mixture for every 100 equivalents of hydroxy or thiol-containing monomer therein.

The amount of alpha, gamma diketone to be used in the practice of this invention depends upon the quantity of metal chelate catalyst in the propellant formulation, as well as on the binder composition used. Fast curing binder systems containing a high proportion of primary hydroxyl groups require more alpha, gamma diketone than slow curing binder systems. Further, propellants containing ingredients such as copper chromite and the like have been found to require a higher percentage of alpha, gamma diketone. In general, the amount of alpha, gamma diketone required in order to obtain adequate pot life can be expressed in terms of the ratio of moles of alpha, gamma diketone to moles of metal chelate. Adequate pot life is obtained within the range of from 1–1 to 3–1 moles of diketone for each mole of metal chelate. However, other ratios of alpha, gamma diketone to metal chelate may be employed within the scope of this invention.

The following examples are included for purposes of illustrating the novel process of this invention. These examples are intended for illustrative purposes only and should not be construed as limitative of the scope of the invention in any way. In the examples the parts and percentages are by weight unless otherwise indicated.

*Example I*

This example describes the pot life tests in which propellant formulations with and without alpha, gamma diketone were prepared and their pot life determined by viscosity measurements after a number of hours at 110° F. To a pot was added 3.95 parts of polypropylene ether glycol, 6.52 parts of poly-1,2-oxybutylene glycol, and 3.905 parts of isodecyl pelargonate. To this was added 0.1 part of phenyl beta naphthylamine, 0.1 part of copper chromite, 0.05 part of quinone, and 0.005 part of a silicon oil antifoam (sold by Dow Corning under the trade name DC–200). This was stirred for 7 minutes and then 17 parts of powdered aluminum was added and stirring was continued for another 7 minutes. The mixture was then gradually heated to 130° F. During the heating 67 parts of ammonium perchlorate were added in three increments. When the mixture reached a temperature of 130° F., 0.84 part of 2,3-dihydroxypropyl bis-(2-cyanoethyl)amine was added, and mixing was continued for 45 minutes under vacuum. Then 0.015 part of ferric acetylacetonate and 1.015 parts of hexamethylene diisocyanate were added. The mixture was then maintained at 130° F. for 10 minutes. This batch (Batch A) was then cooled down to 110° F. and maintained at this temperature so that the viscosity stability of the batch at this temperature could be measured and the pot life thus determined.

Two other batches identical to the above in formulation except for the inclusion of 0.0043 (Batch B) and 0.0086 part (Batch C), respectively, of acetylacetone were prepared. In each case, the acetylacetone was added shortly after the addition of the ferric acetylacetonate and hexamethylene diisocyanate. All three of the batches thus prepared were maintained at 110° F. The viscosity of all of the batches was measured hourly at 110° F., using a Brookfield viscometer having a #7 spindle at ½ revolution per minute. The viscosity measurements obtained are listed in the following table:

TABLE I

| Hold Time (hours) | Viscosity (in poises) of Batch A containing no acetylacetone | Viscosity (in poises) of Batch B containing 0.0043 part acetylacetone | Viscosity (in poises) of Batch C containing 0.0086 part acetylacetone |
|---|---|---|---|
| 1 | 13,000 | 4,000 | 1,500 |
| 2 | 28,000 | 11,000 | 2,500 |
| 3 | Too high to measure. | 60,000 | 4,000 |
| 4 | ......do...... | Too high to measure. | 5,700 |
| 5 | ......do...... | ......do...... | 8,000 |
| 6 | ......do...... | ......do...... | 12,000 |
| 7 | ......do...... | ......do...... | 18,500 |
| 8 | ......do...... | ......do...... | 31,000 |

Turning to the figure, which graphically shows the results set forth in Table I, it will be seen that this graph shows the relationship between the viscosity and the hold time of the uncured propellant batches. As has been indicated on the graph, it has been found that when the viscosity of a propellant batch exceeds 25,000 poises, it is no longer suitable for casting. This level has been indicated on the graph as the line of demarcation between castable and uncastable formulations. As shown by the graph, Batch A which contained no acetylacetone retained a useful pot life for approximately 1.8 hours. The Batch B containing 0.0043 part of acetylacetone, retained a useful pot life for approximately 2.6 hours, and the Batch C containing 0.0086 part of acetylacetone retained a useful pot life for approximately 7.5 hours. Thus it can be seen that the useful pot life of polyurethane propellant formulations is greatly enhanced by the use of a small amount of the acetylacetone.

The following are other polyurethane propellant formulations containing acetylacetone and which have been found to possess improved pot life. These batches were prepared in accordance with the procedure set forth in Example I.

*Example II*

| Ingredient: | Parts |
|---|---|
| Ammonium perchlorate | 67.5 |
| Aluminum | 16.5 |
| Copper chromite | 1.0 |
| Sulfur | 0.05 |
| Phenyl beta naphthylamine | 0.05 |
| Ferric acetylacetonate | 0.015 |
| Acetylacetone | 0.01 |
| Dioctyl azelate | 1.5 |
| 2,3-dihydroxypropyl bis-2-cyanoethyl)amine | 0.23 |
| Bis-(dinitropropyl) acetal | 5.0 |
| Polypropylene ether glycol | 7.0 |
| Hexamethylene diisocyanate | 1.1 |

When the above example is repeated using benzoyl acetone in lieu of acetylacetone, the pot life of the formulation is also satisfactory.

Example III

| Ingredient: | Parts |
| --- | --- |
| Ammonium perchlorate | 67.0 |
| Aluminum | 17.0 |
| Copper chromite | 0.3 |
| 2,3 - dihydroxypropyl bis - (2 - cyanoethyl) amine | 0.35 |
| Sulfur | 0.05 |
| Ferric acetylacetonate | 0.015 |
| The condensation product of glycerine and propylene oxide, having a molecular weight of about 4000 | 3.0 |
| Hexamethylene diisocyanate | 1.1 |
| Neopentyl glycol azelate | 2.5 |
| Polypropylene ether glycol | 4.7 |
| Acetylacetone | 0.006 |

When small amounts of acetylacetone or benzoyl acetone are incorporated in any of the polyurethane propellant formulations disclosed in assignee's copending U.S. patent application, Serial No. 829,180, now Patent No. 3,245,849, filed July 20, 1959, the pot life of the formulation is substantially lengthened.

It will be understood that various modifications may be made in this invention without departing from the spirit thereof or the scope of the appended claims.

We claim:
1. In the method of preparing a solid propellant composition which comprises intimately dispersing a solid inorganic oxidizing salt in a binder mixture consisting essentially of a compound having as its sole reacting groups not less than two active hydrogen groups capable of polymerizing with an isocyanate and a compound having as its sole reacting groups not less than two groups capable of undergoing a urethane-type reaction with hydroxy groups, and wherein the urethane catalyst comprises a catalytic amount of a chelate having the general formula:

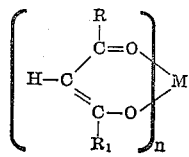

wherein R and $R_1$ are non-reactive monovalent organic radicals, M is a metal radical having a coordination number equal to twice its electro valence and $n$ is an integer which corresponds to the electro valence of M; the improvement which comprises employing an effective amount of an alpha, gamma diketone having the formula:

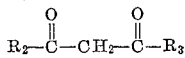

wherein $R_2$ and $R_3$ are non-reactive monovalent organic radicals selected from the group consisting of alkyl, aryl, haloalkyl and haloaryl, to increase the pot life of said polyurethane composition.

2. The method of claim 1 wherein the polyurethane composition is subsequently cured at a temperature within the range from about 130° F. to about 180° F.

3. In the method of preparing a solid propellant composition which comprises intimately dispersing from about 45 to about 95 percent by weight of a solid inorganic oxidizing salt in from about 5 percent to about 55 percent by weight of a binder mixture consisting essentially of a compound having as its sole reacting groups not less than two active hydrogen groups capable of polymerizing with an isocyanate and a compound having as its sole reacting groups not less than two groups capable of undergoing a urethane-type reaction with hydroxy groups, and wherein the urethane catalyst comprises a catalytic amount of a chelate having the general formula:

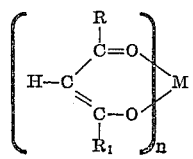

wherein R and $R_1$ are non-reactive monovalent organic radicals, M is a metal radical having a coordination number equal to twice its electro valence and $n$ is an integer which corresponds to the electro valence of M; the improvement which comprises employing an effective amount of an alpha, gamma diketone having the formula:

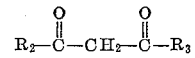

wherein $R_2$ and $R_3$ are non-reactive monovalent organic radicals selected from the group consisting of alkyl, aryl, haloalkyl and haloaryl, to increase the pot life of said polyurethane composition.

4. In the method of preparing a solid propellant composition which comprises intimately dispersing of from about 45 percent to about 95 percent by weight of a solid inorganic oxidizing salt in from about 5 percent to about 55 percent by weight of a binder mixture consisting essentially of a compound having as its sole reacting groups not less than two active hydrogen groups capable of polymerizing with an isocyanate and a stoichiometric excess of a compound having as its sole reacting groups not less than two groups capable of undergoing a urethane-type reaction with hydroxy groups, the stoichiometric excess being calculated as in excess over all active hydrogen groups capable of polymerizing with an isocyanate originally present, and wherein the urethane catalyst comprises a catalytic amount of a chelate having the general formula:

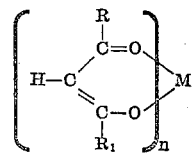

wherein R and $R_1$ are non-reactive monovalent organic radicals, M is a metal radical having a coordination number equal to twice its electro valence, and $n$ is an integer which corresponds to the electro valence of M; the improvement which comprises employing an effective amount of an alpha, gamma, diketone having the formula:

wherein $R_2$ and $R_3$ are non-reactive monovalent organic radicals selected from the group consisting of alkyl, aryl, haloalkyl and haloaryl, to increase the pot life of said polyurethane composition.

5. In the method of preparing a solid propellant composition which comprises intimately dispersing from about 45 percent to about 95 percent by weight of a solid inorganic oxidizing salt in from about 5 percent to about 55 percent by weight of a binder mixture consisting essentially of a compound having as its sole reacting groups not less than two active hydrogen groups capable of polymerizing with an isocyanate and a stoichiometric excess of a compound having as its sole reacting groups not less than two groups capable of undergoing a urethane-type reaction with hydroxy groups, the stoichiometric excess of reacting material containing groups capable of undergoing a urethane-type reaction with hydroxy groups over the reactant material containing active hydrogen groups capable of polymerizing with an isocyanate corresponding to a proportion of from about 100 to about 115 equivalents of the former for every 100 equivalents of the latter, and wherein the urethane catalyst comprises a catalytic amount of a chelate having the general formula:

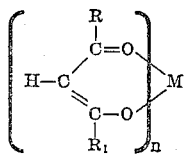

wherein R and $R_1$ are non-reactive monovalent organic radicals, M is a metal radical having a coordination of equal to twice its electro valence and $n$ is an integer which corresponds to the electro valence of M; the improvement which comprises employing an effective amount of alpha, gamma diketone having the formula:

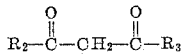

wherein $R_2$ and $R_3$ are non-reactive monovalent organic radicals selected from the group consisting of alkyl, aryl, haloalkyl and haloaryl, to increase the pot life of said polyurethane composition.

6. In the method of preparing a solid propellant composition which comprises intimately dispersing from about 45 percent to about 95 percent by weight of a solid inorganic oxidizing salt in from about 5 percent to about 55 percent by weight of a binder mixture consisting essentially of a compound having as its sole reacting groups not less than two active hydrogen groups capable of polymerizing with an isocyanate and a stoichiometric excess of a compound having as its sole reacting groups not less than two groups capable of undergoing a urethane-type reaction with hydroxy groups, the stoichiometric excess of reacting material containing groups capable of undergoing a urethane-type reaction with hydroxy groups over the reactant material containing active hydrogen groups capable of from about 100 to about 115 equivalents of the former for every 100 equivalents of the latter, and wherein the urethane catalyst comprises a catalytic amount of a chelate having the general formula:

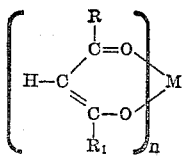

wherein R and $R_1$ are non-reactive monovalent organic radicals, M is a metal radical having a coordination of equal to twice its electro valence and $n$ is an integer which corresponds to the electro valence of M; the improvement which comprises employing an effective amount of alpha, gamma diketone having the formula:

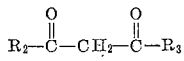

wherein $R_2$ and $R_3$ are non-reactive monovalent organic radicals selected from the group consisting of alkyl, aryl, haloalkyl and haloaryl, to increase the pot life of said polyurethane composition, the mole ratio of said diketone to said chelate being in the range of from about 1 to 1, to about 3 to 1.

7. In the method of preparing a solid propellant composition which comprises intimately dispersing a solid inorganic oxidizing salt in a binder mixture consisting essentially of an aromatic diisocyanate, a polyether glycol having a molecular weight of from about 400 to about 10,000 and a trihydroxy cross-linker compound, and wherein the urethane catalyst comprises a catalytic amount of a chelate having the general formula:

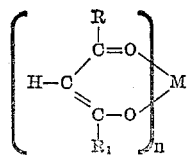

wherein R and $R_1$ are non-reactive monovalent organic radicals, M is a metal radical having a coordination number equal to twice its electro valence and $n$ is an integer which corresponds to the electro valence of M; the improvement which comprises employing an effective amount of an alpha, gamma diketone having the formula:

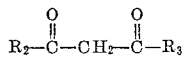

wherein $R_2$ and $R_3$ are non-reactive monovalent organic radicals selected from the group consisting of alkyl, aryl, haloalkyl and haloaryl to increase the pot life of said polyurethane composition.

8. In the method of preparing a solid propellant composition which comprises intimately dispersing a solid inorganic oxidizing salt in a binder mixture consisting essentially of an aromatic diisocyanate, a polyether glycol having a molecular weight of from about 400 to about 10,000, and a trihydroxy cross-linker compound, said inorganic oxidizing salt being present in an amount between about 45 percent and about 95 percent by weight of a propellant composition, the binder mixture being present in an amount between about 55 percent and about 5 percent by weight of a propellant composition, the said aromatic diisocyanate being present in a stoichiometric excess, the stoichiometric excess having been calculated as an excess over the total amounts of polyether glycol and trihydroxy compounds initially present, and wherein the urethane catalyst comprises a catalytic amount of a chelate having the general formula:

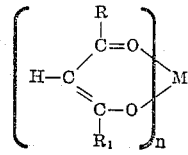

wherein R and $R_1$ are non-reactive monovalent organic radicals, M is a metal radical having a coordination number equal to twice its electro valence and $n$ is an integer which corresponds to the electro valence of M; the improvement which comprises employing an effective amount of an alpha, gamma diketone having the formula:

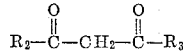

wherein $R_2$ and $R_3$ are non-reactive monovalent organic radicals selected from the group consisting of alkyl, aryl, haloalkyl and haloaryl to increase the pot life of said polyurethane composition.

9. In the method of preparing a solid propellant composition which comprises intimately dispersing a solid inorganic oxidizing salt in a binder mixture consisting essentially of toluene diisocyanate, a polyether glycol having a molecular weight from about 400 to about 10,000 and a trihydroxy cross-linker compound, the said inorganic oxidizing salt being present in an amount between about 45 percent and about 95 percent by weight of the propellant composition, the binder mixture being present in an amount between about 55 percent and about 5 percent by weight of the propellant composition the said toluene diisocyanate being present in a stoichiometric excess, the stoichiometric excess having been calculated as an excess over the total amounts of polyether glycol and trihydroxy compounds initially present, wherein the urethane catalyst comprises a catalytic amount of a chelate having the general formula:

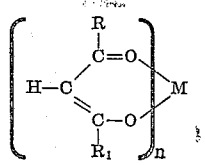

wherein R and $R_1$ are non-reactive monovalent radicals, M is a metal radical having a coordination number equal to twice its electro valence and $n$ is an integer which corresponds to the electro valence of M; the improvement which comprises employing an effective amount of an alpha, gamma diketone having the formula:

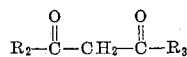

wherein $R_2$ and $R_3$ are non-reactive monovalent organic radicals selected from the group consisting of alkyl, aryl, haloalkyl and haloaryl to improve the pot life of said polyurethane composition.

10. In the method of preparing a solid propellant composition which comprises intimately dispersing a solid inorganic oxidizing salt in a binder mixture consisting essentially of toluene diisocyanate, a polyether glycol having a molecular weight from about 400 to about 10,000 and a trihydroxy cross-linker compound, the said inorganic oxidizing salt being present in an amount between about 45 percent and about 95 percent by weight of the propellant composition, the binder mixture being present in an amount between about 55 percent and about 5 percent by weight of the propellant composition, the said toluene diisocyanate being present in a stoichiometric excess, the stoichiometric excess having been calculated as an excess over the total amounts of polyether glycol and trihydroxy compounds initially present, wherein the urethane catalyst comprises a catalytic amount of ferric acetyl acetonate; the improvement which comprises employing an effective amount of acetylacetone to increase the pot life of said polyurethane composition.

11. In the method of preparing a solid propellant composition which comprises intimately dispersing a solid inorganic oxidizing salt in a binder mixture consisting essentially of toluene diisocyanate, a polyether glycol having a molecular weight from about 400 to about 10,000 and a trihydroxy cross-linker compound, the said inorganic oxidizing salt being present in an amount between about 45 percent and about 95 percent by weight of the propellant composition, the binder mixture being present in an amount between about 55 percent and about 5 percent by weight of the propellant composition, the said toluene diisocyanate being present in a stoichiometric excess, the stoichiometric excess having been calculated as an excess over the amounts of polyether glycol and trihydroxy compounds initially present, wherein the urethane catalyst comprises a catalytic amount of ferric acetyl acetonate, the improvement which comprises employing an effective amount of acetylacetone to increase the pot life of said polyurethane composition, the mole ratio of said acetylacetone to said ferric acetylacetonate being in a range of from about 1 to 1, to about 3 to 1.

12. In the method of preparing a solid propellant composition which comprises intimately dispersing a solid inorganic oxidizing salt in a binder mixture consisting essentially of 2,4-toluene diisocyanate, polypropylene glycol and glycerol monoricinoleate, the inorganic oxidizing salt being present in an amount between about 45 percent and about 95 percent by weight of the propellant composition, the binder mixture being present in an amount between about 55 percent and about 5 percent by weight of the propellant composition, the said 2,4-toluene diisocyanate being present in a stoichiometric excess, the stoichiometric excess having been calculated as an excess over the amounts of polypropylene glycol and glycerol monoricinoleate initially present, and wherein the urethane catalyst comprises a catalytic amount of ferric acetylacetonate; the improvement which comprises employing an effective amount of acetylacetone to increase the pot life of said polyurethane composition.

13. In the method of preparing a solid propellant composition which comprises intimately dispersing a solid inorganic oxidizing salt in a binder mixture consisting essentially of 2,4-toluene diisocyanate, polypropylene glycol and glycerol monoricinoleate, the inorganic oxidizing salt being present in an amount between about 45 percent and about 95 percent by weight of the propellant composition, the binder mixture being present in an amount between about 55 percent and about 5 percent by weight of the propellant composition, the said 2,4-toluene diisocyanate being present in a stoichiometric excess, the stoichiometric excess having been calculated as an excess over the total amounts of polypropylene glycol and glycerol monoricinoleate initially present, and wherein the urethane catalyst comprises a catalytic amount of ferric acetylacetonate; the improvement which comprises employing an effective amount of acetylacetone to increase the pot life of said polyurethane composition, the mole ratio of said acetylacetone to said ferric acetylacetonate in the range of from about 1 to 1, to about 3 to 1.

14. In the method of preparing a solid propellant composition which comprises intimately dispersing a solid inorganic oxidizing salt in a binder mixture consisting essentially of a stoichiometric excess of an aromatic diisocyanate and a polyether glycol having a molecular weight from about 400 to about 10,000, said excess being calculated as an excess over all active hydrogen groups capable of polymerizing with a diisocyanate, the said inorganic oxidizing salt being present in an amount between about 45 percent to about 95 percent by weight of the propellant composition, and the said binder mixture being present in an amount between about 55 percent and about 5 percent by weight of the propellant composition, and wherein the urethane catalyst comprises a catalytic amount of a chelate having the general formula:

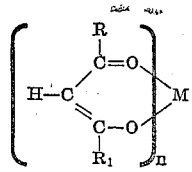

wherein R and $R_1$ are non-reactive monovalent organic radicals, M is a metal radical having a coordination equal to twice its electro valence, and $n$ is an integer which corresponds to the electro valence of M; the improvement which comprises employing an effective amount of an alpha, gamma diketone having the formula:

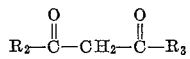

wherein $R_2$ and $R_3$ are non-reactive monovalent organic radicals selected from the group consisting of alkyl, aryl, haloalkyl, and haloaryl to increase the pot life of said polyurethane composition.

15. In the method of preparing a solid propellant composition which comprises intimately dispersing a solid inorganic oxidizing salt in a binder mixture comprising a stoichiometric excess of an aromatic diisocyanate and a dihydroxy polyester having a molecular weight from about 1,000 to about 2,500, said stoichiometric excess being calculated as an excess over all active hydrogen groups capable of polymerizing with the diisocyanate, said inorganic oxidizing salt being present in an amount between about 45 percent to about 95 percent by weight of the propellant composition, and the resin binder being present in an amount between about 55 percent and about 5 percent by weight of the propellant composition, and wherein the urethane catalyst comprises a catalytic amount of a chelate having the general formula:

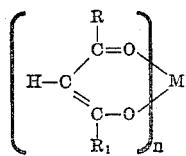

wherein R and R₁ are non-reactive monovalent organic radicals, M is a metal radical having a coordination equal to twice its electro valence, and $n$ is an integer which corresponds to the electro valence of M; the improvement which comprises employing an effective amount of an alpha, gamma diketone having the formula:

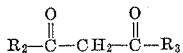

wherein R₂ and R₃ are non-reactive monovalent organic radicals selected from the group consisting of alkyl, aryl, haloalkyl and haloaryl to increase the pot life of said polyurethane composition.

16. In the method of preparing a solid propellant composition which comprises intimately dispersing a solid inorganic oxidizing salt in a binder mixture consisting essentially of a stoichiometric excess of an alkane diisocyanate and a polyether glycol having a molecular weight from about 400 to about 10,000, said excess being calculated as an excess over all active hydrogen groups capable of polymerizing with a diisocyanate, the said inorganic oxidizing salt being present in an amount between about 45 percent to about 95 percent by weight of the propellant composition, and the said binder mixture being present in an amount between about 55 percent and about 5 percent by weight of the propellant composition, and wherein the urethane catalyst comprises a catalytic amount of a chelate having the general formula:

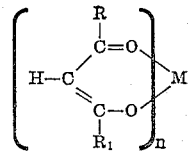

wherein R and R₁ are non-reactive monovalent organic radicals, M is a metal radical having a coordination equal to twice its electro valence, and $n$ is an integer which corresponds to the electro valence of M; the improvement which comprises employing an effective amount of an alpha, gamma diketone having the formula:

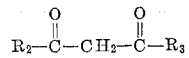

wherein R₂ and R₃ are non-reactive monovalent organic radicals selected from the group consisting of alkyl, aryl, haloalkyl and haloaryl to increase the pot life of said polyurethane composition.

17. An uncured propellant composition having improved pot life which comprises an intimate mixture of a solid inorganic oxidizing salt, a binder mixture consisting essentially of a compound having as its sole reacting group not less than two active hydrogen groups capable of polymerizing with an isocyanate and a compound having as its sole reacting groups not less than two groups capable of undergoing a urethane-type reaction with hydroxy groups, a catalytic amount of a urethane catalyst having the general formula:

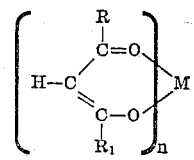

wherein R and R₁ are non-reactive monovalent organic radicals, M is a metal radical having a coordination of twice its electro valence, and $n$ is an integer which corresponds to the electro valence of M, and an alpha, gamma diketone having the formula:

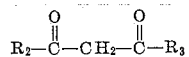

wherein R₂ and R₃ are non-reactive monovalent organic radicals selected from the group consisting of alkyl, aryl, haloalkyl and haloaryl, said alpha, gamma diketone being employed in an amount effective to improve the pot life of said polyurethane composition.

18. An uncured propellant composition having improved pot life which comprises an intimate mixture of a solid inorganic oxidizing salt, a binder mixture consisting essentially of a compound having as its sole reacting group not less than two active hydrogen groups capable of polymerizing with an isocyanate and a compound having as its sole reacting groups not less than two groups capable of undergoing a urethane-type reaction with hydroxy groups, a catalytic amount of a urethane catalyst having the general formula:

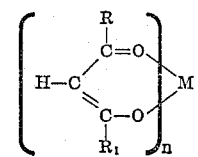

wherein R and R₁ are non-reactive monovalent organic radicals, M is a metal radical having a coordination of twice its electro valence, and $n$ is an integer which corresponds to the electro valence of M, and an alpha, gamma diketone having the formula

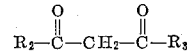

wherein R₂ and R₃ are non-reactive monovalent organic radicals selected from the group consisting of alkyl, aryl, haloalkyl and haloaryl, said alpha, gamma diketone being employed in an amount effective to improve the pot life of said polyurethane composition, the mole ratio of said diketone to said chelate being in the range of from about 1 to 1, to about 3 to 1.

19. An uncured propellant composition having improved pot life which comprises an intimate mixture of a solid inorganic oxidizing salt, a binder mixture consisting essentially of a stoichiometric excess of an aromatic diisocyanate and a polyether glycol having a molecural weight from about 400 to about 10,000, said stoichiometric excess being calculated as an excess over all active hydrogen groups capable of polymerizing with a diisocyanate, a catalytic amount of a chelate catalyst having the general formula:

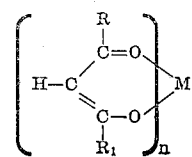

wherein R and $R_1$ are nonreactive monovalent organic radicals, $m$ is a metal radical having a coordination of equal to twice its electro valence, and $n$ is an integer which corresponds to the electro valence of M, and an alpha, gamma diketone having the formula:

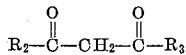

wherein $R_2$ and $R_3$ are non-reactive monovalent organic radicals selected from the group consisting of alkyl, aryl, haloalkyl and haloaryl said alpha, gamma diketone being employed in an amount effective to improve the pot life of said polyurethane composition.

20. An uncured propellant composition having improved pot life which comprises an intimate mixture of a solid inorganic oxidizing salt, a binder mixture consisting essentially of a stoichiometric excess of an aromatic diisocyanate and a dihydroxy polyester having a molecular weight from about 1,000 to about 2,500, said stoichiometric excess being calculated as an excess over all active hydrogen groups capable of polymerizing with a diisocyanate, a catalytic amount of a urethane catalyst having the general formula:

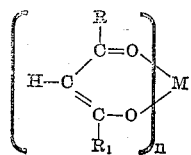

wherein R and $R_1$ are nonreactive monovalent organic radicals, $m$ is a metal radical having a coordination of equal to twice its electro valence, and $n$ is an integer which corresponds to the electro valence of M, and an alpha, gamma diketone having the formula:

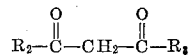

wherein $R_2$ and $R_3$ are non-reactive monovalent organic radicals selected from the group consisting of alkyl, aryl, haloalkyl and haloaryl said alpha, gamma diketone being employed in an amount effective to improve the pot life of said polyurethane composition.

21. An uncured propellant composition having improved pot life which comprises an intimate mixture of a solid inorganic oxidizing salt, a binder mixture consisting essentially of a compound having as its sole reacting groups not less than two active hydrogen groups capable of polymerizing with an isocyanate and a compound having as its sole reacting groups not less than two groups capable of undergoing a urethane-type reaction with hydroxy groups, a catalytic amount of ferric acetylacetonate, and acetylacetone said acetylacetone being employed in an amount effective to improve pot life, the mole ratio of said acetylacetone to said ferric acetylacetonate from about 1 to 1, to about 3 to 1.

No references cited.

BENJAMIN R. PADGETT, *Primary Examiner.*

REUBEN EPSTEIN, *Examiner.*